United States Patent [19]

Marheine

[11] 4,255,621
[45] Mar. 10, 1981

[54] BILLING INTERFACE CIRCUIT

[75] Inventor: Edward A. Marheine, Brookfield, Wis.

[73] Assignee: GTE Automatic Electric Laboratories, Incorporated, Northlake, Ill.

[21] Appl. No.: 81,581

[22] Filed: Oct. 3, 1979

[51] Int. Cl.³ .................. H04M 11/00; H04M 15/10; H04M 15/34
[52] U.S. Cl. ........................ 179/27 CA; 179/27 FG; 179/7 R
[58] Field of Search ............. 179/27 FG, 27 FH, 7 R, 179/7 MM, 7.1 R, 7.1 TP, 42, 27 CA, 27 FF, 27 F, 27 FB, 8 R, 9, 8 A, 18 AD

[56] References Cited

U.S. PATENT DOCUMENTS

| 3,536,839 | 10/1970 | Prins | 179/27 FG |
| 3,721,769 | 3/1973 | Krock et al. | 179/18 AD |
| 3,920,912 | 11/1975 | Anderson et al. | 179/7.1 TP |

Primary Examiner—Thomas A. Robinson
Attorney, Agent, or Firm—Robert J. Black; Frank J. Bogacz

[57] ABSTRACT

A billing interface circuit for controlling the billing of a station of a private branch exchange via a telephone central office. This circuit automatically connects an intercept recorder to the operator requesting time and charges while providing ring back tone to the station. Therefore, the attendant at the private branch exchange is relieved of the task of manually interfacing between the station and the telephone central office to request time and charges information for billing.

10 Claims, 1 Drawing Figure

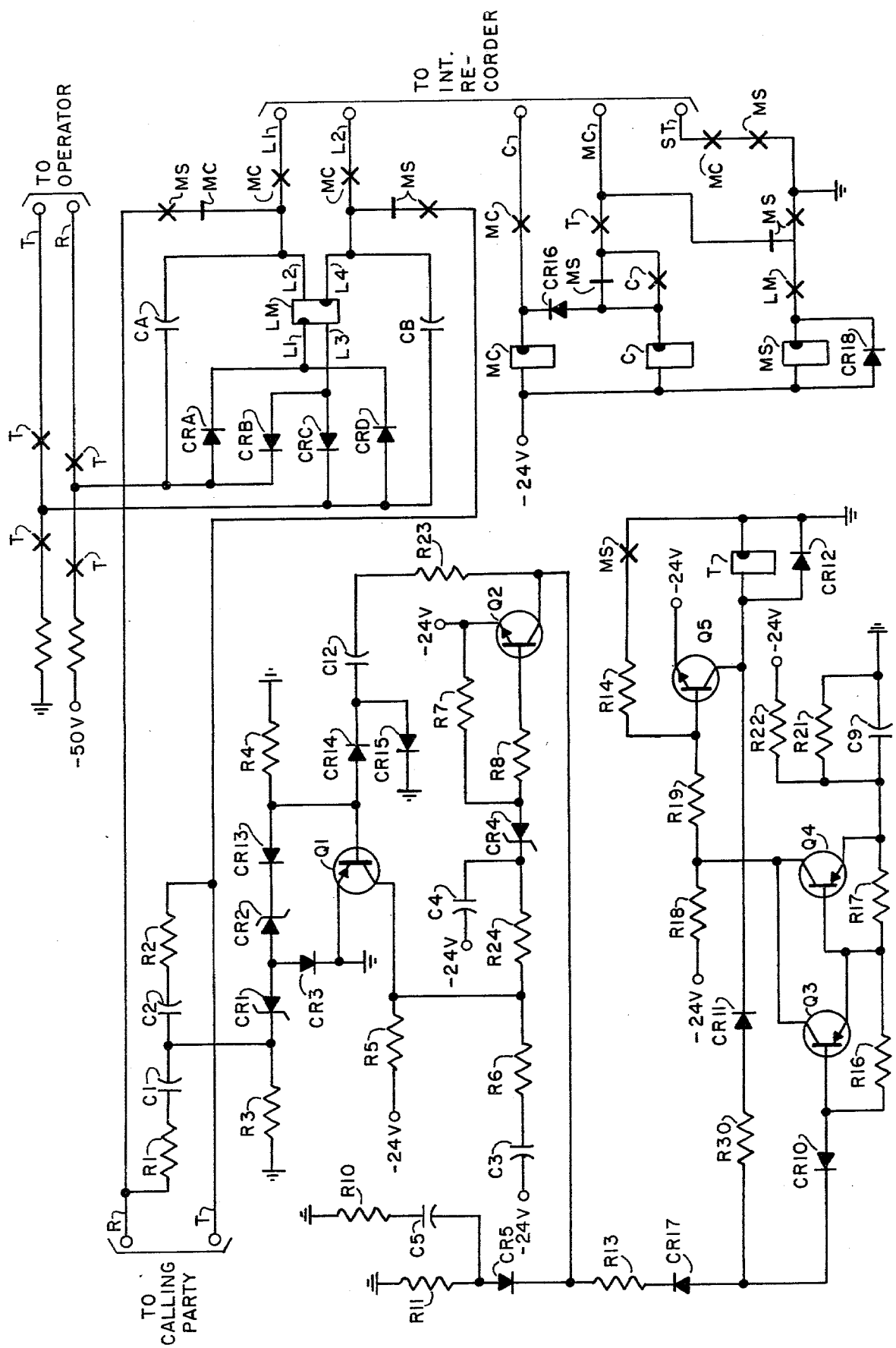

BILLING INTERFACE CIRCUIT

BACKGROUND OF THE INVENTION (1) Field of the Invention

This invention relates to communications between a telephone central office and a private branch exchange and more particularly to a billing interface arrangement for automatically requesting time and charge information.

(2) Description of the Prior Art

Presently, hotels and motels provide their guests with telephone stations located in their room. Commonly, a private branch exchange connects all the stations of the hotel or motel to a telephone central office for switching through the telephone system. The telephone service provided by the hotels and motels must be capable of handling long distance and toll calls.

Presently, the hotels and motels supplying this toll service must either lease expensive equipment or provide an attendant to place and monitor these calls. Presently, an attendant must detect the guest's station making a call for service. The attendant must determine that the calling station is to make a toll call and ring the toll operator located at the telephone central office. When the toll operator has answered the attendant must request that the operator provide the attendant with the time and charges allocated to the present call. Such a system requires much valuable time of a hotel or motel attendant. Therefore, automating this function is highly desirable.

A complex solution to this problem is taught by U.S. Pat. No. 3,721,769, issued on Mar. 20, 1973, to E. W. Krock et al and U.S. Pat. No. 3,920,912, issued on Nov. 18, 1975 to H. P. Anderson et al. The above patents teach the use of complex electronic circuitry in order to automate the billing function for a private branch exchange associated with a large-size hotel or motel system.

For small or rural motels such a solution is not economical. A simple self-contained unit is highly desirable.

Therefore it is the object of the present invention to provide an automated billing interface arrangement for toll calling stations of a small motel private branch exchange.

It is an important object of the present invention to provide the automated billing function mentioned in an economical fashion for use by small motels or in rural areas.

SUMMARY OF THE INVENTION

The present invention comprises a billing interface circuit for use in conjunction with a private branch exchange connected to a telephone central office. This circuit is connected to a calling party, an operator and a recorded announcement playback machine. The billing interface circuit includes a coupling network connected between the tip and ring leads of the calling party and the remainder of the circuit. A ring detection circuit is connected to the coupling network and includes a transistor with a suitable biasing network and a diode array further including zener diodes. A ringing status storage network is connected to the ring detection circuit and a pulse generating circuit is connected to the ringing status storage network. A relay latching network is connected to the pulse generating circuit. The relay latching network operates first and second relay switching networks.

When a calling party at the private branch exchange dials the access code to reach the toll operator, a connection is established to the billing interface circuit via the tip and ring leads. The calling party receives ring back tone and the billing interface circuit receives ringing signal. The ringing signal is coupled via the coupling network to the ring detection network. The ring detection network detects only the negative portion of the ringing cycle and blocks the positive portion of the ringing cycle. For each negative portion of ringing cycle a pulse is produced and passed through an amplification network to operate a latching relay network.

When the latching relay network operates, the first relay switching network establishes a connection via the tip and ring leads to an operator and the second relay switching network establishes a connection between the operator connection and a recorded announcement playback machine. The operator then hears a recorded message identifying the motel or hotel and requesting the time and charge information concerning this particular call. The operator is then connected through to the particular calling party and thereafter the call is handled by the operator in the customary fashion.

The second relay switching network contains logic to detect whether the recorded announcement playback machine is presently operating for some other billing interface circuit and to queue the present request until such time as the recorded announcement playback machine becomes idle and its tape mechanism returned to its initial position. At this time, the billing circuit connects to the recorded announcement playback machine and operates it to playback the recorded message to the operator. When the calling party has completed the call and places the receiver on-hook, the second relay switching network detects this change and returns to an idle condition. If the calling party abandons the call prior to the transfer of the call to the operator the billing interface circuit, detects this change and prevents further operation of the circuit returning the circuit to its initial condition.

DESCRIPTION OF THE DRAWING

The single of sheet of drawings included herewith comprises a schematic diagram of a billing interface circuit embodying the principles of operation the present invention.

DESCRIPTION OF THE PREFERRED EMBODIMENT

The present invention consists of a billing interface circuit connected between a calling party of a private branch exchange, an operator associated with a central telephone office and a recorded announcement playback machine. The billing interface circuit includes a coupling network connected between the tip lead T and ring lead R composed of resistors R1 and R2 and capacitors C1 and C2. The coupling network transmits the signals on the tip lead T and ring lead R to the ring detection network. Ringing voltage is transmitted via this connection to the ring detection network comprising transistor Q1, resistors R3 and R4, zener diodes CR1 and CR2 and diodes CR3 and CR13. Resistor R3 and zener diodes CR1 and CR2 reduce the possibility of false operation of transistor Q1. The positive half cycle of the ringing voltage is blocked from the input of transistor Q1 by diode CR13 and is grounded via diode CR3. The negative half-cycles are coupled to transistor Q1 via diode CR13. The ringing status storage network composed of capacitors C3 and C4 and resistors R5, R6 and R24 is connected to the collector of transistor Q1. After approximately 250 MS, capacitor C4 is charged sufficiently to cause zener diode CR4 to conduct, forward biasing transistor Q2. As a result, transistor Q2 turns-on and provides an output pulse. The network which includes diode CR14, capacitor C12 and resistor R23 provides additional drive to transistor Q1, thereby guaranteeing that transistor Q2 saturates fully.

Transistor Q3 is forward biased and as a result conducts and forward biases transistor Q4. Transistor Q4 conducts and forward biases transistor Q5. When transistor Q5 conducts, relay T is operated and a negative potential is connected to the base of transistor Q3. As a result, the combination of transistors Q3, Q4 and Q5 is held in a conducting state. Further, when relay T operates the tip lead T and ring lead R are connected to the diode bridge comprising diodes CRA, CRB, CRC and CRD, capacitors CA and CB and relay LM. In addition, when relay T operates relays MC and C are closed.

If the interrupt recorder is presently in operation no ground appears on the MC lead and relay MC is prevented from operating. However, if the recorded announcement playback machine is idle relays MC and C operate via the connection of ground to the MC lead. When relay MC operates a start path is established from ground through MC and MS contacts to the ST lead. When the central office operator connects to the billing interface circuit, relay LM receives battery and ground and operates via the ring lead R through the T contact, CRA, the L1-L2 coil of relay LM and the MC contact to the recorded announcement playback machine. When the recorded announcement machine is at the start of the tape message, relay MS operates through its normally closed form D contact. If the machine had previously been called for service by another billing circuit before the central office operator answered, relay MS is prevented from operating until the message tape returns to its initial position. When the recorded announcement machine is idle it is started via ground through the MS and MC contacts to the machine. Relays C and MC are operated and held through the C contacts. The particular message is delivered via the L1 and L2 terminals to the operator. At the completion of the message, relay C restores and ground connection is transferred from relay C to relay MC.

When relay MC restores it is inhibited from operating again by the MS contact, thereby the operator receives only one playback of the recorded message.

After relay MC restores the operator is connected via a talking path to the calling party through the diode bridge CRA-D and the relay LM. At this time, the operator may complete the call in the customary fashion. When the call is completed the calling party goes on-hook and relay LM retores and the billing circuit returns to its initial condition.

If the calling party abandons the call prior to transfer to the operator, ringing voltage is removed from the tip lead T and ring lead R and transistor Q1 is turned off thereby turning off transistor Q2. Capacitor C5 discharges via resistor R11 allowing a discharge via resistors R10 and R11. Thereby, the billing interface circuit is returned to its initial condition. The recorded announcement playback machine may comprise an INT-2 device manufactured by GTE Automatic Electric Co. or equivalent.

Although a preferred embodiment of the invention has been illustrated, and that form described in detail, it will be readily apparent those skilled in the art that various modifications may be made therein without departing from the spirit of the invention or from the scope of the appended claims.

What is claimed is:

1. A billing interface circuit for use in a private branch exchange including a plurality of stations, said exchange connected to a telephone central office via first and second leads including a trunk, said central office including voice playback means operated to provide a recorded message requesting billing information from an operator located at said telephone central office, said billing interface circuit comprising:
ring detection means connected to a station of said plurality and operated in response to a ringing signal of said station to produce a first signal representative of said ringing signal detection;
latching means connected to said ring detection means and operated in response to said first signal to produce a steady state output signal;
first switching means connected to said latching means and operated in response to said steady state output signal to connect said voice playback means to said first and said second leads for transmission of said recorded message to said operator; and
second switching means connected between said latching means and said voice playback means and operated in response to said steady state output signal to control the operation of said tape playback means, whereby said voice playback means is operated when said voice playback means is idle and in a start position and alternatively said voice playback means is prohibited from operation when said voice playback means was previously operated.

2. A billing interface circuit as claimed in claim 1, wherein: said ring detection means includes coupling means connected to said station, detection means connected to said coupling means, ring status storage means connected to said detection means for storing an indication of the ringing status of said station and pulsing means connected between said ring status storage means and said latching means for determining when said station is providing said ringing signal whereby said billing interface circuit is activated.

3. A billing interface circuit as claimed in claim 2, wherein: said coupling means includes a first resistor, a first capacitor, a second capacitor and a second resistor connected in series between said first and second leads.

4. A billing interface circuit as claimed in claim 2, wherein: said detection means includes a diode array and a first transistor connected between said coupling means and said ring status storage means.

5. A billing interface circuit as claimed in claim 2, wherein: said ring status storage means includes first and second capacitors and first, second and third resistors connected between said detection means and said pulsing means.

6. A billing interface circuit as claimed in claim 2, wherein: said pulsing means includes a first transistor, a zener diode and capacitor means connected between ring status storage means and said latching means.

7. A billing interface circuit as claimed in claim 1, wherein: there is further included circuit means providing for time out of said billing circuit.

8. A billing interface circuit as claimed in claim 1, wherein: said latching means includes a first transistor connected to said pulsing means and second and third transistors connected to said first transistor and a relay connected to said third transistor, said relay operated in response to said third transistor to apply negative potential to said first transistor whereby said steady state output signal is produced.

9. A billing interface circuit as claimed in claim 1, wherein: said first switching means includes a diode bridge circuit and a relay operated to connect said recorded message of said voice playback means to said operator.

10. A billing interface circuit as claimed in claim 1, wherein: said second switching means includes a first relay connected to said voice playback means for determining whether said tape playback means is in idle condition;
- a second relay connected to said first relay and to said voice playback means for operating said voice playback means when said voice playback means is in idle condition;
- a third relay connected to said first and to said second relays and to said voice playback means for delaying said operation of said first and second relays until said idle condition is detected whereby said third relay operates said first and second relays to initiate said voice playback means.

* * * * *